No. 882,697. PATENTED MAR. 24, 1908.
H. R. KUMLER.
SHOCK ABSORBING VEHICLE WHEEL.
APPLICATION FILED JAN. 30, 1907.

Witnesses:—
Frank R. Graham
Pete S. Alter

Inventor;
Hervey R. Kumler
by
Johnwelt Hackley & Knight
His attys.

UNITED STATES PATENT OFFICE.

HERVEY R. KUMLER, OF ETIWANDA, CALIFORNIA.

SHOCK-ABSORBING VEHICLE-WHEEL.

No. 882,697.

Specification of Letters Patent.

Patented March 24, 1908.

Application filed January 30, 1907. Serial No. 354,954.

*To all whom it may concern:*

Be it known that I, HERVEY R. KUMLER, a citizen of the United States, residing at Etiwanda, in the county of San Bernardino and State of California, have invented a new and useful Shock-Absorbing Vehicle-Wheel, of which the following is a specification.

This invention relates to spring wheels, and the main objects of the invention are to provide a shock absorbing vehicle wheel the spokes of which may be constructed of wood and to provide a substantial and practical means for securing the spokes to the hub.

Further objects are to provide a wheel of the character described which is simple in construction, effective in operation and durable in use.

Figure 1:
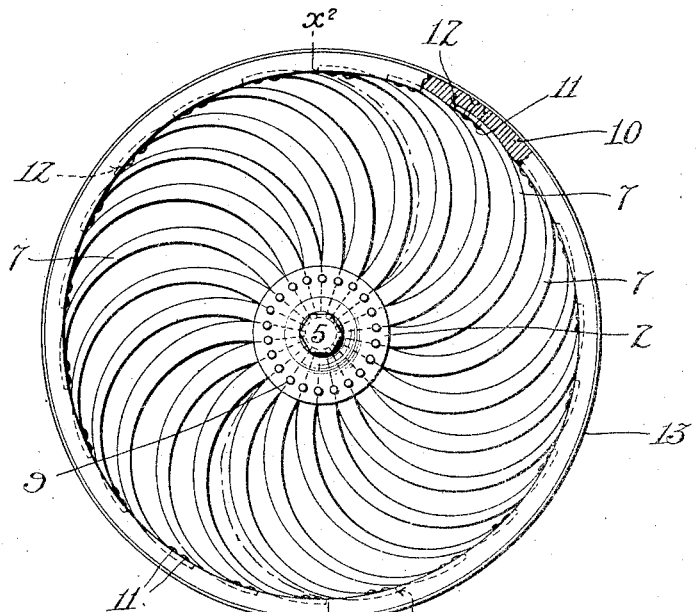
Figure 2:
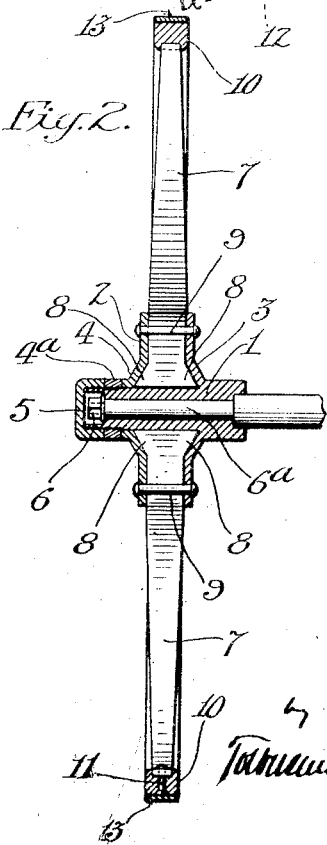

The accompanying drawings illustrate the invention, and referring thereto:—Figure 1 is a side elevation of the wheel. Fig. 2 is a sectional view on line $x^2$—$x^2$ Fig. 1.

The hub of the wheel comprises a barrel 1 having a flange 2 with a conical recess 3 at the junction of the flange with the barrel. A sleeve 4, the inner end of which is provided with a flange 2 similar to the flange on barrel 1, is slipped on the barrel 1. In order to hold the sleeve 4 in position on the end of the barrel 1, a sleeve $4^a$ is screwed on to the barrel; and a dust cap 5 is screwed onto the end of the barrel 1 and protects the nut 6 on the end of axle $6^a$. The sleeve $4^a$ firmly holds the sleeve 4 in place, and enables the dust cap 5 to be removed when desired to give access to the interior of the barrel without disturbing or loosening any of the parts which hold the spokes in place.

A large number of spokes 7 are employed, each spoke being constructed preferably of wood, and being curved as shown. Each spoke is tapered on each of its sides nearly to its inner end from whence two of the sides are parallel for a short distance for the engagement therewith of the flat portions of the flanges 2 and the butt of each spoke is provided with a pair of lateral wedge shaped wings 8, which fit under the conical portions 3 of the flanges 2. The butt of each spoke is also formed wedge shaped, as shown in Fig. 1, so that when the spokes are assembled in position the dividing lines or joints between the butts of the respective spokes are radial to the axis of the barrel 1. The spokes are held in position by means of the wings 8 which project under the sloping portions 3 of the flanges 2, and also by means of a series of bolts or rivets 9, which pass through the flanges 2 and between the spokes, each spoke having on each side of its inner end between the wings 8 and the tapering outer portion a half-rounded recess which receives its portion of the rivet 9, thus the spokes are absolutely locked in position on the hub. By locating the recesses at this point, or within the length of the spoke having the parallel sides, the bolts 9 can pass through the flat portions of the flanges 2 and draw them rigidly against the straight parallel sides of the spokes with a strain which is at right angles to said surfaces, thereby securing a much more durable fastening than would be the case with the strain applied on inclined surfaces. The outer ends of the spokes are fastened to the felly 10 by means of screw bolts 11, the felly being provided with sunken recesses, each forming a shoulder 12, and the recesses receive the respective ends of the spokes, the end of each spoke abutting against the adjacent shoulder 12. A tire 13 is mounted on the felly 10.

It will be seen that on account of the curvature of the spokes the hub of the wheel is not rigid with respect to the rim of the wheel, but that in operation any jolts which are sustained by the rim will result in springing the spokes of the wheel without imparting any sudden jars to the hub. The braced construction of the spokes, and their secure attachment to the hub, prevents any dishing of the wheel.

What I claim is:—

In a wheel, a hub having a flange at its inner end and a longitudinal bore at its outer end, the flange being conically recessed at its base and flat and perforated in its outer portion and the recessed end of the hub being of the same diameter and exteriorly screw threaded to a point beyond the bottom of said recess, said screw threads being continuous and uniform, a flange loosely seated upon the hub adjacent to said threaded portion having its base conically recessed and its outer portion flat and perforated, a nut on said threaded portion in engagement with the base of said loosely mounted flange, a cap on the outer end of the hub in engagement with said nut, a felly provided with shouldered recesses upon its inner surface, a series of curved spokes, the outer portion of each of which is tapered and fits in one of said recesses, the inner end of each spoke being provided with a pair of lateral, wedge shaped wings which fit in the conical portions of said flanges, two of the sides adjacent thereto being parallel and fitting between the flat sides of said flanges and the other two sides converging toward each other at the inner end of the spoke and being each provided with a half round recess which is adapted to register with the perforations through said disks, bolts through said perforations and recesses, and bolts through the outer end of each spoke and the felly.

In testimony whereof, I have hereunto set my hand at Etiwanda, Calif., this 23d day of January, 1907.

HERVEY R. KUMLER.

In presence of—
 Mrs. W. P. MYERS,
 AARON MYERS.